April 2, 1957     E. S. HOOBLER     2,787,352
BRAKE AND THROTTLE CONTROL DEVICE FOR AUTOMOTIVE VEHICLE
Filed Oct. 19, 1953
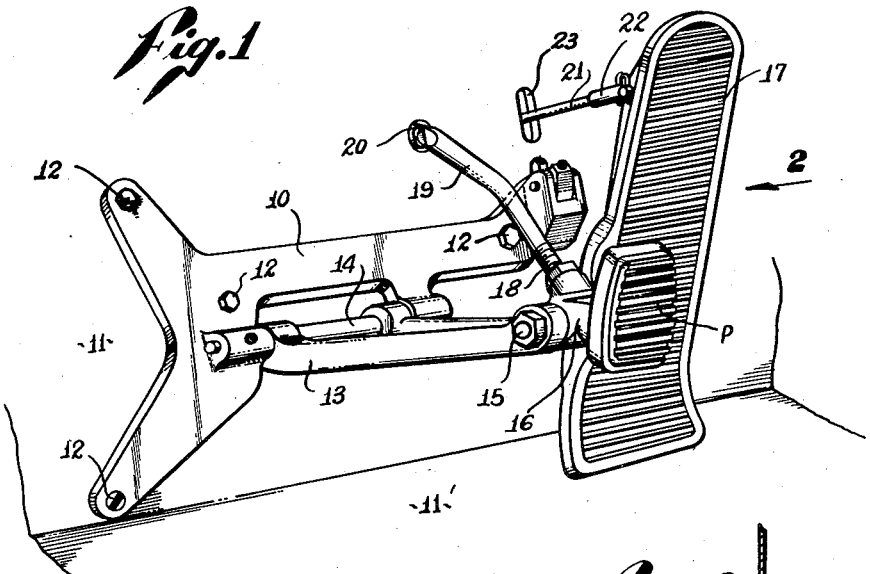
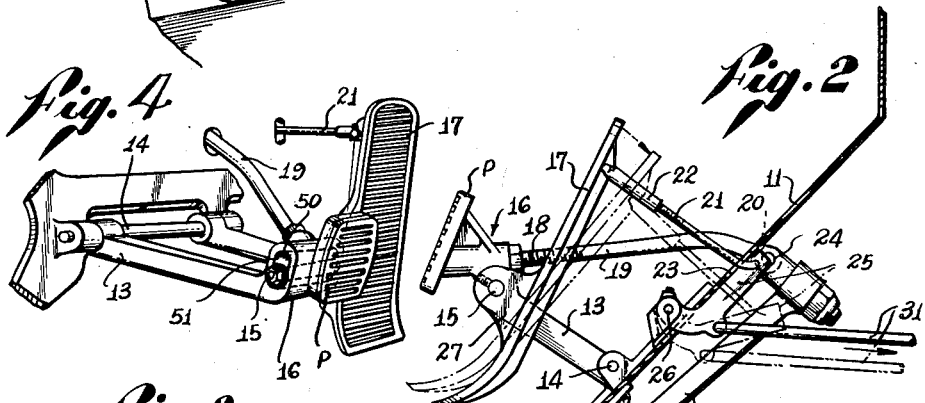
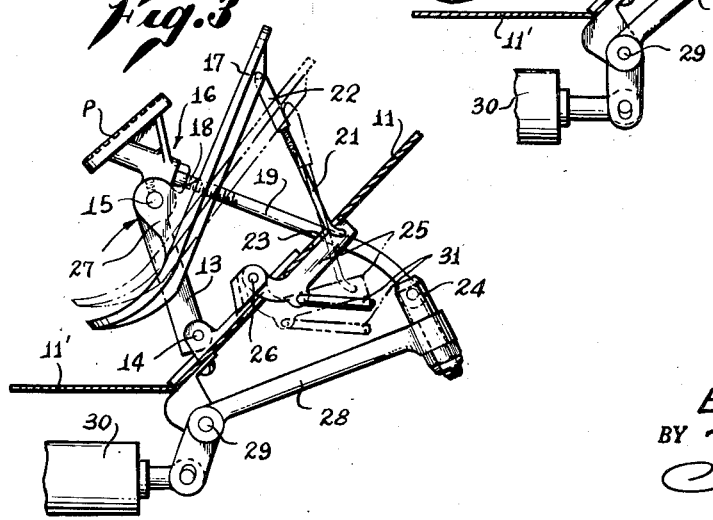
INVENTOR.
ERNEST S. HOOBLER
BY
Attorney

United States Patent Office 2,787,352
Patented Apr. 2, 1957

2,787,352

BRAKE AND THROTTLE CONTROL DEVICE FOR AUTOMOTIVE VEHICLE

Ernest S. Hoobler, Anaheim, Calif., assignor, by mesne assignments, to Mercury International Research Company, Walteria, Calif., a corporation of California Application October 19, 1953, Serial No. 386,842

2 Claims. (Cl. 192—3)

This invention relates to a foot operated control device for operating either selectively or simultaneously the braking mechanism and throttle control of an automotive vehicle. The present application is a continuation-in-part of my abandoned copending application Serial No. 269,715, filed February 4, 1952, and entitled Control for Automotive Vehicles.

The advantages of a single pedal control for operating both the brake and accelerator of a car selectively and simultaneously are numerous. Such a control, for example, will enable an operator with just one foot to apply the brakes and accelerating power to the car simultaneously and then gradually release the brakes while still applying the accelerator to thus start the car up a hill without backroll. Further, the provision of a single pedal eliminates the time element involved in shifting the foot from the accelerator to the brake pedal. Such a pedal is particularly well suited to cars provided with hydromatic or fluid drive wherein the clutching and gear shifting is effected automatically. These type vehicles have a tendency to "creep" forward, and it is highly advantageous to be able to operate the accelerator and brake mechanism simultaneously thereby avoiding the nuisance of constantly shifting from the accelerator pedal to the brake pedal in parking, starting and stopping, and backing or turning around in small areas.

In the past, single control pedals for operating both the brakes and accelerator of an automobile have generally required extensive modification of the conventional braking and accelerating pedals. Usually these devices comprise a single pedal mounted for compound movement in the floorboard of the vehicle. One movement of the pedal, such as a forward translation, serves to apply the brakes through suitable mechanical linkages to the braking mechanism; another movement, such as a rotation or tilting of the pedal, serves to operate the throttle control through further mechanical linkages.

Not only have these devices necessitated raising the conventional accelerator off of the floorboard to permit such compound movements, but also various resilient means such as springs have had to be incorporated to prevent unintentional operation of the brakes. For example, such a spring is generally arranged to bias the brakes in release position when only the accelerator is to be operated. An arrangement of this nature oftentimes results in the operator unconsciously "riding" the brakes while operating the accelerator in spite of such resilient means. Furthermore, the provision of such springs requires the application of a greater than normal thrust on the part of the operator to apply the brakes.

It is an object of the present invention, to provide an improved single pedal device mounted for compound movement to apply selectively or simultaneously the brakes and accelerator of an automobile, which is greatly simplified in mechanical construction and readily adapted for installation on many existing vehicles with little or no alteration thereof.

A further object of the invention is to provide an improved mounting means for such a pedal which obviates the need for complicated biasing springs and virtually eliminates the possibility of unintentional "riding" of the brakes.

A particular object is to provide in combination with a single pedal control device of this nature, a unique mounting for the pedal per se, whereby the pedal is positioned adjacent the floorboard in substantially the conventional position and yet may be easily manipulated by the operator's foot for executing the necessary compound movements.

A more particular and novel object in this regard is to provide a unique mounting for the pedal which is adapted to support the operator's foot in a relaxed, comfortable position for any particular setting of the throttle control, whereby when the throttle control is positioned for cruising speed, for example, the operator need not continually exert pressure on the pedal to maintain such setting. In other words the mere relaxed weight of the leg and foot on the pedal after it is once positioned by movement of the foot is sufficient to retain the pedal and throttle in such position.

Still another object of the invention is to provide a pedal mount in which greatly increased force may be applied to the conventional braking mechanism by executing one of the compound movements for which the pedal is adapted.

These and further objects and advantages of the invention are attained by providing a single arm means pivoted to the frame or floorboard of the vehicle at one end and pivotally supporting a single pedal at its other end. The arm is thus capable of an arcuate forward movement with respect to the floorboard about its lower pivot which action applies the brakes of the vehicle through a suitable rigid member coupled to the arm at its upper end and extending through the floorboard to the braking mechanism.

The pivotal mounting for the pedal at the upper end of the arm means is effected by a flange support element secured to the side of the pedal and extending upwardly above the surface level of the pedal, the upper end of this flange element being pivotally secured to the upper end of the arm whereby the pedal depends downwardly from said upper pivot point to a position adjacent the floorboard. Small arcuate or rocking movement of the pedal about this flange pivot point is communicated to the throttle control by a single link secured at one end to the toe portion of the pedal its other end extending into the floorboard. The pedal is thus capable of compound movement, the braking movement of the pedal following a convex arc about the arm frame or floorboard pivot and the throttle movement of the pedal following a smaller concave arc under the upper flange pivot point.

A better understanding of the device will be had by referring to the following detailed description and accompanying drawings in which:

Fig. 1 is a perspective view of the combination brake and throttle control device mounted on the floorboard of a conventional automobile;

Fig. 2 is a side elevation view of the device as seen in the direction of the arrow 2 of Fig. 1;

Fig. 3 is a side view similar to Fig. 2 but showing the position of the pedal during braking action; and Fig. 4 shows an alternative brake coupling means.

Referring to Fig. 1, the device comprises a main mounting bracket 10 secured to the inclined floorboard 11 of a conventional automobile by any suitable means such as bolts 12. A forked arm means 13 is pivotally mounted on a pivot shaft 14 in turn secured to the bracket 10 as shown. Arm 13 is thus adapted for a forward arcuate movement about said pivot shaft 14 and its forked construction at its lower end rigidly confines such movement to forward and rearward directions only. While arm means 13 is shown as pivoted to a bracket secured to the floorboard, this pivotal mounting may be of the frame of the vehicle beneath the floorboard if desired. In this latter event suitable slots in the floorboard would be provided to accommodate motion of the arm means.

The upper end of arm 13 journals another pivot shaft 15 to which is rigidly secured a mounting structure 16 supporting a pedal 17 and threadedly receiving at 18 one end of a brake actuating arm 19, the other end of said arm extending through floorboard 11 at 20. The length of this actuating arm between the mounting structure 16 and floorboard 11, in the brake release position, may be conveniently adjusted by threading more or less of the end of arm 19 into the mounting structure 16.

The pedal 17 includes a link 21 threadedly received in a sleeve 22 in turn pivotally secured to the toe portion of the pedal. The other end of link 21 passes through a suitable slot opening 23 in floorboard 11 to a throttle actuating mechanism. The length of link 21 between the toe portion of pedal 17 and the floorboard for engine idling position of the throttle control, is adjustable by threading more or less of the link 21 in the sleeve 22.

As best seen in Figs. 2 and 3, the rearward arcuate movement of the arm 13 about its floorboard pivot shaft 14 is limited by the end coupling 24 of brake actuating arm 19, which coupling is sufficiently large as to abut against the floorboard opening 20 when the brake actuating arm is in brakes released position. Similarly the upward arcuate movement of the toe portion of pedal 17 is limited by a plate 25 pivoted to the floorboard 11 at 26 at one end, and pivoted to link 21 at its other end, which plate abuts against the end edges of the slot 23 when the throttle control is in engine idle position. It will be seen from Figs. 2 and 3 of the drawing that the above described arm and link arrangement forms substantially a parallelogram linkage construction wherein the movement of pedal 17 from the position of Fig. 2 to the position of Fig. 3 is substantially translational.

Referring to the pedal supporting mount in greater detail as shown in Fig. 2, it will be seen that the pedal 17 includes a flange element 27, extending above the surface level of the pedal and rigidly secured at its upper end to pivot shaft 15, said shaft being rotatable in the upper end of lever arm 13. By this arrangement it is seen that pedal 17 may assume a normal position relatively close to the level portion 11' of floorboard 11 yet still be adequately mounted for compound movements. Further, it will be seen that rocking movement of pedal 17 about the upper pivot point of arm 13 is a distinctly different movement from the forward arcuate translation of the pedal when arm 13 is caused to pivot about the floorboard pivot axis 14.

Referring still to Figs. 2 and 3, the brake actuating arm 19 is shown as pivotally coupled at 24 to a bell crank lever 28 pivotally mounted to the underside of floorboard 11 at 29 and adapted to operate the conventional brake cylinder plunger (not shown) in brake cylinder 30. Also the link 21 from the toe portion of pedal 17 is pivotally secured to plate 25 which plate is coupled to a throttle control rod 31 adapted to open or close the conventional butterfly valve in the engine carburetor upon longitudinal movement. On most automobiles, this throttle control rod 31 is conventionally spring loaded to the idling position, or biased in the direction indicated by the arrow in Fig. 2 so that plate 25 is urged against the underside of the floorboard 11 and pedal 17 is in its solid line position.

In operation, it will be appreciated at once that when the operator's foot is resting normally on pedal 17 there will be no tendency for the arm 13 to be swung arcuately forward. This is because the arm 19 is suitably adjusted in length so that the normal disposition of arm 13 is such that the pivot points 14 and 15 are in substantial alinement with the lower portion of the operator's leg.

Thus, the "resting" force of the operator's leg is fully supported by the arm 13 and there is no tendency for the operator to "ride" the brakes by arcuate forward motion of arm 13 unless pedal 17 is intentionally thrust forward.

Thus, with the operator's foot leisurely resting on pedal 17, the brakes are in released position and the throttle is in idling position. This state of affairs is illustrated by the solid line positions of the pedal 17 and arm 13 in Fig. 2. When the operator wishes to accelerate the car he merely rocks the pedal 17 by exerting pressure on the toe section to depress link 21, so that the pedal, link, plate 25 and rod 31 assume the positions shown in phantom lines. This movement is easily executed without application of the brakes.

However, if the operator wishes to apply the brakes, he need only give the normal forward thrusting movement to the pedal 17 to swing arm 13 arcuately forward to the position shown in solid lines in Fig. 3. This action depresses bell crank lever 28 by action of arm 19 to move the brake cylinder plunger into brake cylinder 30. It is to be noted that in this braking position, the throttle control link may still be actuated as shown by the phantom lines in Fig. 3 to permit simultaneous control of both brakes and acceleration. The pressure built up in brake cylinder 30 serves to push the brake actuating arm and arm 13 back to inoperative position when the driver releases the forward pressure on pedal 17.

A particularly important and novel feature of the invention resides in the unique pivotal mounting of the pedal itself to the arm 13. Not only does the small arcuate rocking movement of the pedal about its raised flange pivot point result in a distinct movement for throttle control as compared to the brake actuating movement, as pointed out above, but this underslung supporting feature permits the pedal to be retained by the foot in any one position once it has been set, without any appreciable retaining force other than that supplied by the natural relaxed weight of the operator's foot. For example, were the pivotal mounting for the pedal on the same level as the pedal surface, the pedal would be unstable to the extent that the operator would have to consciously maintain a force on the toe portion of the pedal to retain it and thus the throttle setting in the desired position. By suspending the pedal from a pivot point above the surface of the pedal as shown in the drawings, the relaxed weight of the operator's foot alone is substantially sufficient to retain the pedal in its set position. The great advantage of this feature can be readily appreciated by those who drive for long hours at a set cruising speed and heretofore have had to maintain a force on the pedal to maintain cruising speed. As is well known, most modern vehicles are not now supplied with hand throttles and therefore the above noted advantages of the present invention are particularly desirable. Furthermore, the underslung arrangement of the pedal results in a tendency to release the throttle when applying the brakes due to the dual arcuate movements that take place.

In the event it is not desired to modify the car by providing the pivot 24, a pin and slot arrangement may be employed as shown in Fig. 4 wherein the journalling for pivot shaft 15 only engages the lower portion of the shaft and extends upwardly in an arcuate slot 50, the latter accommodating relative movement between the arm 13 and arm 19 as is necessary when arm 19 is rigid on the bell crank 28.

In the various figures of the drawing, an additional pedal P has been shown secured to the mounting structure 16. This pedal is not necessary for operation of the device but is merely provided in the event a driver or attendant in a parking lot, for example, is not familiar with the combination pedal control. Thus the brakes may be conventionally operated by merely shifting the foot from the pedal 17 to the pedal P to depress the brakes in the usual manner.

I claim:

1. A foot operated device for use in an automotive vehicle having brake mechanism and throttle mechanism, comprising: a mounting bracket for attachment to the floor board of the vehicle, a support arm pivoted at one end to the bracket, a brake arm pivoted at one end to the other end of the support arm for pivotal movement about an axis parallel to the pivotal axis of the support arm on the bracket, a brake pedal rigid on said one end of the brake arm and having a foot engaging surface in a transverse plane of the brake arm substantially parallel to said axes, means on the other end of the brake arm for attachment of the latter to the brake mechanism of the vehicle, an elongate brake and accelerator pedal pivotally mounted intermediate its ends on said other end of the support arm for pivotal movement about an axis paralleling said first mentioned axes, said accelerator pedal being offset from the brake pedal in a direction along said axes and having a foot engaging surface offset toward the mounting bracket from the foot engaging surface of the brake pedal, and linkage attached at one end to the accelerator pedal and including means at its other end for connection to the throttle mechanism.

2. The subject matter of claim 1 including a common pivotal connecting means pivotally connecting the brake arm and accelerator pedal to the support arm.

References Cited in the file of this patent

UNITED STATES PATENTS

| | | |
|---|---|---|
| 283,514 | Robison | Aug. 21, 1883 |
| 1,549,347 | Davis | Aug. 11, 1925 |
| 1,671,169 | Swain | May 29, 1928 |
| 2,042,202 | Althouse | May 26, 1936 |
| 2,139,010 | Franks | Dec. 6, 1938 |
| 2,547,593 | Morris | Apr. 3, 1951 |
| 2,600,267 | Ruscito et al. | June 10, 1952 |

FOREIGN PATENTS

| | | |
|---|---|---|
| 1,029,894 | France | Mar. 11, 1953 |